(12) United States Patent
Hwang et al.

(10) Patent No.: US 9,134,400 B2
(45) Date of Patent: Sep. 15, 2015

(54) COMPARATOR OF MONO-PULSE RADAR AND SIGNAL GENERATION METHOD THEREOF

(71) Applicant: National Chiao Tung University, Hsinchu (TW)

(72) Inventors: Ruey-Bing Hwang, Hsinchu (TW); Fang-Yao Kuo, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 169 days.

(21) Appl. No.: 14/079,572

(22) Filed: Nov. 13, 2013

(65) Prior Publication Data

US 2015/0077287 A1 Mar. 19, 2015

(30) Foreign Application Priority Data

Sep. 13, 2013 (TW) .............................. 102133282 A (51) Int. Cl.
*G01S 13/02* (2006.01)
*G01S 7/28* (2006.01)
*G01S 13/44* (2006.01)
*H01Q 25/02* (2006.01)
*H01P 5/16* (2006.01)

(52) U.S. Cl.
CPC ............... *G01S 7/28* (2013.01); *G01S 13/4409* (2013.01); *H01P 5/16* (2013.01); *H01Q 25/02* (2013.01)

(58) Field of Classification Search
CPC .................................. G01S 13/02; G01S 7/28
USPC ................................................. 342/175, 385
See application file for complete search history.

(56) References Cited

U.S. PATENT DOCUMENTS

| 4,590,446 A | 5/1986 | Hsu et al. |
| 5,982,320 A | 11/1999 | Simpson et al. |
| 7,482,894 B2 | 1/2009 | Wu et al. |
| 2007/0036709 A1* | 2/2007 | Lashmore et al. ......... 423/447.1 |

(Continued)

FOREIGN PATENT DOCUMENTS

| CN | 202042584 | 11/2011 |
| CN | 101939758 | 5/2013 |

(Continued)

OTHER PUBLICATIONS

"Office Action of Taiwan Counterpart Application", issued on Dec. 2, 2014, p. 1-p. 6.

(Continued)

*Primary Examiner* — Timothy A Brainard
(74) *Attorney, Agent, or Firm* — Jianq Chyun IP Office (57) ABSTRACT

A comparator of a mono-pulse radar and a signal generation method thereof are provided. The comparator includes an antenna array, a TEM mode cavity power combiner and a switch device. The antenna array includes N antennas. The TEM mode cavity power combiner includes a combination port and M input port sets, and each of the input port sets has a positive input port and a negative input port, wherein N and M are integer greater than 1. The switch device is coupled between the antenna array and the TEM mode cavity power combiner and is used for transmitting the reflected signal received by the antenna array to the positive input port or the negative input port of one of the input port sets. The combination port of the TEM mode cavity power combiner generates an output signal according to the reflected signals received from the input port sets.

6 Claims, 6 Drawing Sheets

(56) References Cited

U.S. PATENT DOCUMENTS

2008/0007449 A1    1/2008   Focke
2008/0191940 A1*   8/2008   Haskell ........................ 342/373

FOREIGN PATENT DOCUMENTS

TW           531659       5/2003
WO        2006009122    1/2006

OTHER PUBLICATIONS

Hong et al., "Differential radial power combiner using substrate integrated waveguide", Electronics Letters, Nov. 25, 2010, vol. 46, Issue: 24, p. 1607-p. 1608.

* cited by examiner

COMPARATOR OF MONO-PULSE RADAR AND SIGNAL GENERATION METHOD THEREOF

CROSS-REFERENCE TO RELATED APPLICATION

This application claims the priority benefit of Taiwan application serial no. 102133282, filed on Sep. 13, 2013. The entirety of the above-mentioned patent application is hereby incorporated by reference herein and made a part of this specification.

BACKGROUND

1. Technical Field

The invention relates to a comparator of a mono-pulse radar. Particularly, the invention relates to a comparator having a transverse electromagnetic (TEM) mode cavity power combiner and a signal generation method thereof.

2. Related Art

Radar (radio detection and ranging) is widely used in military equipment and used for terrain detection, and is also commonly used to detect locations of objects. A working principle of the radar is to emit electromagnetic energy to space, and receive electromagnetic waves reflected by an object in the space, so as to calculate a direction, a height and a speed of the object, and detect a shape of the object. Along with scientific progress in various fields and continuous development of radar technology, connotation and research content thereof are continuously developed, and a mono-pulse technique is widely applied in different fields. Compared to the conventional radar, the mono-pulse radar can obtain information of the object such as direction, height, distance, etc. through only one pulse signal. Moreover, since the mono-pulse radar has advantages of uneasy to be interfered, high resolution, accurate angle detection, etc., it becomes one of the mainstreams of the modern radar system.

Figure 1:
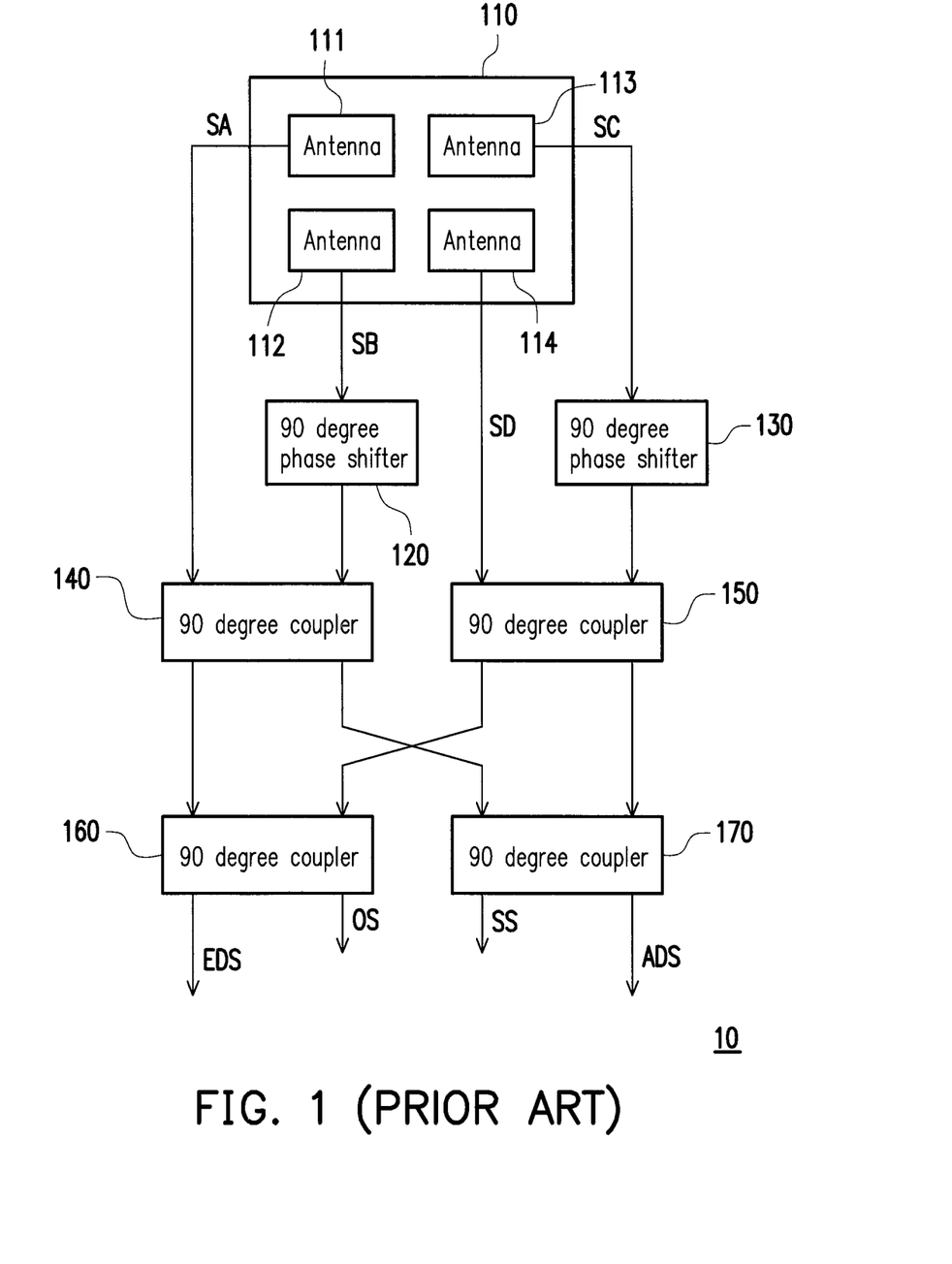
FIG. 1 is a schematic diagram of a conventional comparator of a mono-pulse radar.

Since the mono-pulse radar detects the position information of the object by analyzing a reflected signal received by each antenna, the mono-pulse radar includes a comparator capable of changing the received reflected signal into a related signal containing phase comparison or amplitude comparison. Further, the comparator of the mono-pulse radar generates combination/difference signals according to the reflected signals received by the antennas, and a backend circuit may use the combination/difference signals to determine a space angle of the object. The conventional comparator in the mono-pulse radar is generally composed of a 90 degree or 180 degree coupler, so that the conventional comparator only can operate in a narrower operating bandwidth. FIG. 1 is a structural schematic diagram of a conventional comparator of a mono-pulse radar. Referring to FIG. 1, the comparator 10 has an antenna array 110, a 90 degree phase shifter 120, a 90 degree phase shifter 130, a 90 degree coupler 140, a 90 degree coupler 150, a 90 degree coupler 160 and a 90 degree coupler 170, and the antenna array 110 has an antenna 111, an antenna 112, an antenna 113 and an antenna 114.

The antenna 111 outputs a received reflected signal SA to the 90 degree coupler 140, and the antenna 112 outputs a received reflected signal SB to the 90 degree phase shifter 120. The antenna 113 outputs a received reflected signal SC to the 90 degree phase shifter 130, and the antenna 114 outputs a received reflected signal SD to the 90 degree coupler 150. Based on the structure shown in FIG. 1, the comparator 10 may output four types of combination/difference signals, which are respectively a sum signal SS, a height difference signal EDS, an azimuth difference signal ADS and another signal OS. The sum signal SS is equal to $$\frac{(SA+SB)+(SC+SD)}{2},$$

the height difference signal EDS is equal to $$\frac{(SA+SC)-(SB+SD)}{2},$$

the azimuth difference signal ADS is equal to $$\frac{(SC+SD)-(SA+SB)}{2},$$

and the signal OS is equal to $$\frac{(SA-SB)-(SC-SD)}{2}.$$

Therefore, the backend circuit of the radar that is connected to the comparator 10 may obtain a position and a space angle of the object according to the sum signal SS, the height difference signal EDS and the azimuth difference signal ADS.

However, in the conventional comparator of FIG. 1, regardless of the 90 degree phase shifters or the 90 degree couplers, component design criteria and operating wavelength thereof are all highly correlated, which represents that the operating bandwidths of these components are limited. Namely, limitation of the operating bandwidth of the 90 degree phase shifter or the 90 degree coupler results in reduction of a range of an operating bandwidth of the comparator of the mono-pulse radar. Therefore, regarding the mono-pulse radar, it is important to design a better comparator that is more in line with the needs.

SUMMARY

Accordingly, the invention is directed to a comparator of a mono-pulse radar and a signal generation method thereof, in which by using a TEM mode cavity power combiner and selecting input ports having a phase difference, combination/difference signals required by the mono-pulse radar could be generated, so as to expand a frequency operating range of the comparator of the mono-pulse radar.

The invention provides a comparator of a mono-pulse radar, and the comparator includes an antenna array, a transverse electromagnetic (TEM) mode cavity power combiner and a switch device. The antenna array includes N antennas, where N is an integer greater than 1. The TEM mode cavity power combiner includes a combination port and M input port sets, and each of the input port sets has a positive input port and a negative input port, where M is an integer greater than 1. The switch device is coupled between the antenna array and the TEM mode cavity power combiner and is used for transmitting a reflected signal received by each of the antennas to the positive input port or the negative input port of the input port sets. The combination port of the TEM mode cavity power combiner generates an output signal according to the reflected signals received from the input port sets.

In an embodiment of the invention, the comparator of the mono-pulse radar further includes a clock controller. The clock controller is coupled to the switch device, and outputs a clock control signal to control the switch device, so as to switch one of the positive input port and the negative input port of each of the input port sets to connect the corresponding antenna.

In an embodiment of the invention, the TEM mode cavity power combiner further includes a cylindrical metal cavity, and the combination port is disposed at a center of a first surface of the metal cavity.

In an embodiment of the invention, the positive input port and the negative input port of each of the input port sets are equally spaced while taking the combination port as a center of circle, and the positive input port of each of the input port sets is disposed on the first surface of the metal cavity, and the negative input port of each of the input port sets is disposed on the second surface of the metal cavity.

In an embodiment of the invention, the positive input port, the negative input port and the combination port respectively include a coaxial RF connector and a metal cylinder. The coaxial RF connector is disposed outside the metal cavity for receiving or outputting signals. The metal cylinder is coupled to the coaxial RF connector, and is disposed within the metal cavity, where a radius and a length of the metal cylinder control a matching degree of the comparator.

According to another aspect, the invention provides a signal generation method, which is adapted to a comparator of a mono-pulse radar. The comparator includes an antenna array, a switch device and a TEM mode cavity power combiner. The antenna array includes N antennas, the TEM mode cavity power combiner includes a combination port and M input port sets, and each of the input port sets has a positive input port and a negative input port, where N and M are integers greater than 1. The method includes following steps. First, reflected signals are received through the antennas of the antenna array. Then, the reflected signal received by each of the antennas is transmitted to the positive input port or the negative input port of one of the input port sets through the switch device. An output signal is generated according to the reflected signals received from the input port sets, and the output signal is output through the combination port.

According to the above descriptions, based on the TEM mode cavity power combiner, the switch device is used to switch a feeding position of the reflected signal. In this way, under control of the switch device, the comparator of the mono-pulse radar generates the combination/difference signals required by the backend circuit in time-division, so as to further analyze angle information of an object. Moreover, as the TEM mode cavity power combiner has a characteristic of capability of operating in broadband range, the operation bandwidth of the comparator of the mono-pulse radar is effectively enhanced.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DETAILED DESCRIPTION OF DISCLOSED EMBODIMENTS

The invention provides a comparator of a mono-pulse radar based on a transverse electromagnetic (TEM) mode cavity power combiner, through position arrangement of input ports of the TEM mode cavity power combiner and under control of a switch device, combination signals required by a backend circuit of the mono-pulse radar are generated. In this way, based on the characteristic that the TEM mode cavity power combiner is a broadband operation device, the operation bandwidth of the comparator of the mono-pulse radar can be increased. In order to clearly describe the content of the invention, reference will now be made in detail to the preferred embodiments of the invention.

Figure 2:
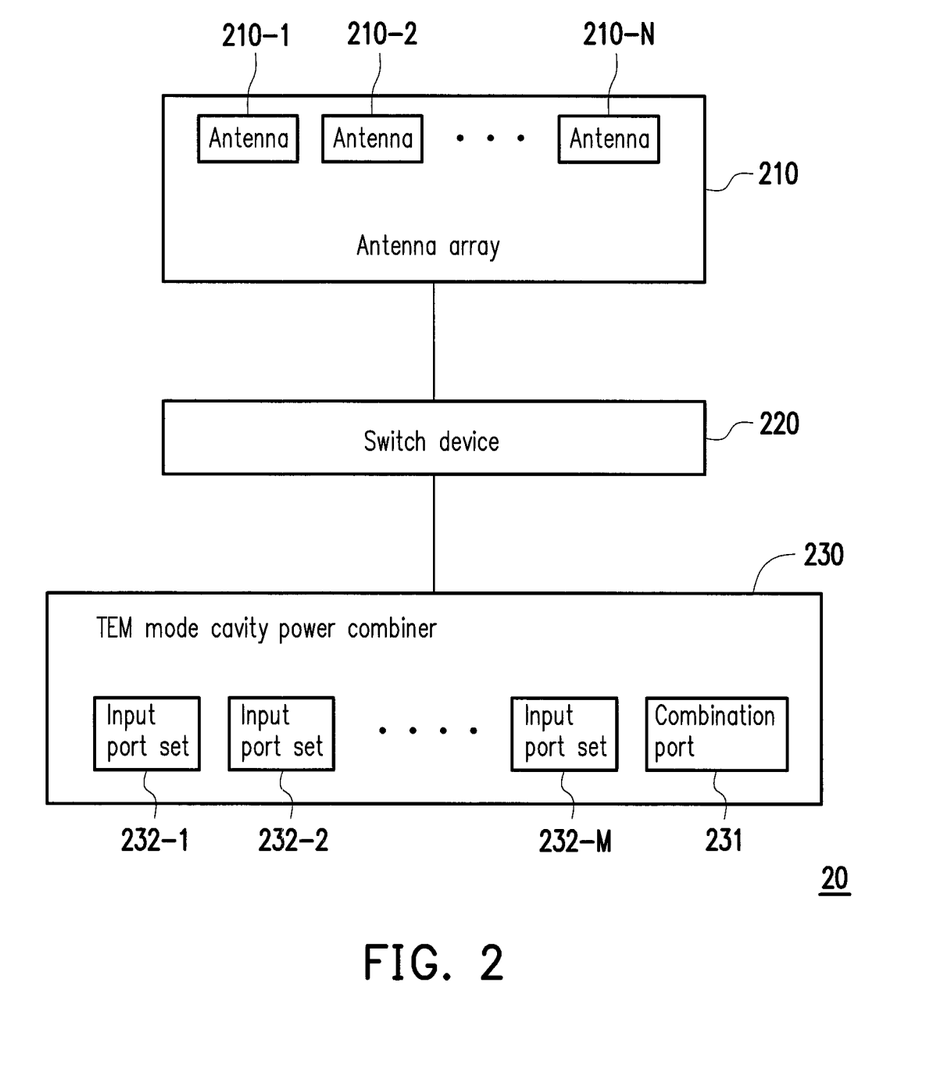
FIG. 2 is a structural schematic diagram of a comparator of a mono-pulse radar according to an embodiment of the invention.

FIG. 2 is a block schematic diagram of a comparator of a mono-pulse radar according to an embodiment of the invention. The comparator 20 of the mono-pulse radar includes an antenna array 210, a switch device 220 and a TEM mode cavity power combiner 230. The antenna array 210 includes N antennas 210-1, 210-2, ..., 210-N, where N is an integer greater than 1. The antenna array 210 is a device located at the most front in the mono-pulse radar, which is in charge of transmitting and receiving signals.

The TEM mode cavity power combiner 230 includes a combination port 231 and M input port sets 232-1, 232-2, ..., 232-M, and each of the input port sets 232-1, 232-2, ..., 232-M has a positive input port and a negative input port respectively, where M is an integer greater than 1. In the present embodiment, the TEM mode cavity power combiner 230 receives a reflected signal transmitted by the antenna array 210 by using the input port sets 232-1, 232-2, ..., 232-M. On the other hand, the combination port 231 of the TEM mode cavity power combiner 230 generates an output signal according to the reflected signal received by the input port sets 232-1, 232-2, ..., 232-M.

It should be noticed that the TEM mode cavity power combiner 230 can also serve as a power distributor. In detail, if the combination port 231 serves an input terminal of the signal, a plurality of output signals divided into multiple paths according to a certain proportion can be obtained from the positive input port and the negative input port of each of the input port sets 232-1, 232-2, ..., 232-M. It should be noticed that since the positive input port of each of the input port sets 232-1, 232-2, ..., 232-M is disposed on a surface of the TEM mode cavity power combiner 230, and the negative input port thereof is disposed on another surface of the TEM mode cavity power combiner 230, the two signals output by the positive input port and the negative input port have a phase difference of 180 degrees. Similarly, in the present embodiment, according to the characteristic of the phase difference of 180 degrees, by selecting one of the positive input port or the negative input port of each of the input port sets 232-1, 232-2, . . . , 232-M as the input terminal, the combination port 231 may produce different output signals.

The switch device 220 is coupled between the antenna array 210 and the TEM mode cavity power combiner 230, and is used for respectively transmitting the reflected signal received by each of the antennas 232-1, 232-2, . . . , 232-M to the positive input port or the negative input port of the corresponding input port sets 232-1, 232-2, . . . , 232-M. In detail, the switch device 220 is used for connecting the positive input port or the negative input port of each of the input port sets 232-1, 232-2, . . . , 232-M to the antenna array 210. Namely, the switch device 220 selects the positive input port or the negative input port of each of the input port sets 232-1, 232-2, . . . , 232-M for connecting to the corresponding antenna in the antenna array 210. The switch device 220 can be a switch, a multiplexer, a logic circuit, or a combination thereof, which is not limited by the invention.

Figure 3:
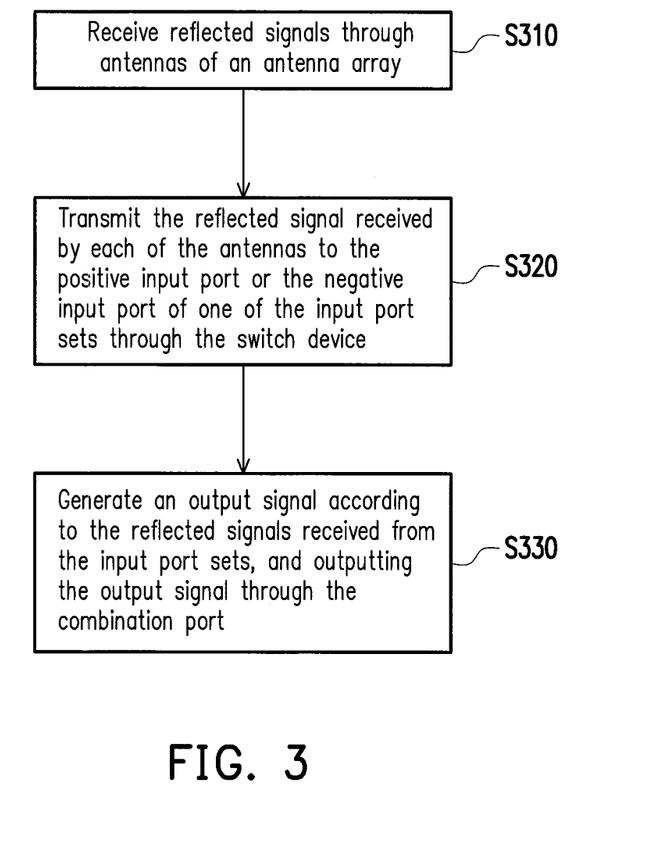
FIG. 3 is a flowchart illustrating a signal generation method according to an embodiment of the invention.

The method that the comparator of the mono-pulse radar generates the combination/difference signals used for estimating a position of the object is described below. FIG. 3 is a flowchart illustrating a signal generation method according to an embodiment of the invention. Referring to FIG. 2 and FIG. 3, the signal generation method can be applied to the comparator 20 shown in FIG. 2. First, in step S310, the comparator 20 receives the reflected signals through the antennas 210-1, 210-2, . . . , 210-N of the antenna array 210. In detail, the antennas 210-1, 210-2, . . . , 210-N emit detection signals used for detecting the object, and when the detection signals contact the object, the detection signals are reflected by the object to form reflected signals. Therefore, the antennas 210-1, 210-2, . . . , 210 receive the reflected signals, and the mono-pulse radar further determines whether the object exist or determines the position information, etc. of the object.

Then, in step S320, the comparator 20 transmits the reflected signals received by each of the antennas 210-1, 210-2, . . . , 210-N to the positive input port or the negative input port of one of the input port sets 232-1, 232-2, . . . 232-M through the switch device 220. Namely, the switch device 220 is used for switching a coupling relationship of the antenna array 210 and the TEM mode cavity power combiner 230. In detail, the switch device 220 may connect the positive input port or the negative input port of the input port set 232-1 to one of the antennas in the antenna array 210. The switch device 220 is used for switching a coupling relationship of the antenna array 210 and the TEM mode cavity power combiner 230. In detail, the switch device 220 may connect the positive input port or the negative input port of the input port set 232-1 to one of the antennas 210-1, 210-2, . . . , 210-N in the antenna array 210. The switch device 220. The switch device 220 may connect the positive input port or the negative input port of the input port set 232-2 to another one of the antennas 210-1, 210-2, . . . , 210-N in the antenna array 210.

Then, in step S330, the comparator 20 generates an output signal according to the reflected signals received by the input port sets 232-1, 232-2, . . . , 232-M of the TEM mode cavity power combiner 230. Namely, based on the coupling relationship between the antenna array 210 and the TEM mode cavity power combiner 230 that is formed through the switch device 220, the combination port 231 generates the corresponding output signal. In other words, different output signals can be generated based on the switch operation of the switch device 220. In this way, based on the phase relationship between the output signal and the input signal of the TEM mode cavity power combiner 230 and by setting of the switch device 220, the comparator 20 may generate related signals containing phase comparison information or amplitude comparison information required by a backend analysis circuit, so as to further detect an angle and a distance of the object.

Figure 4:
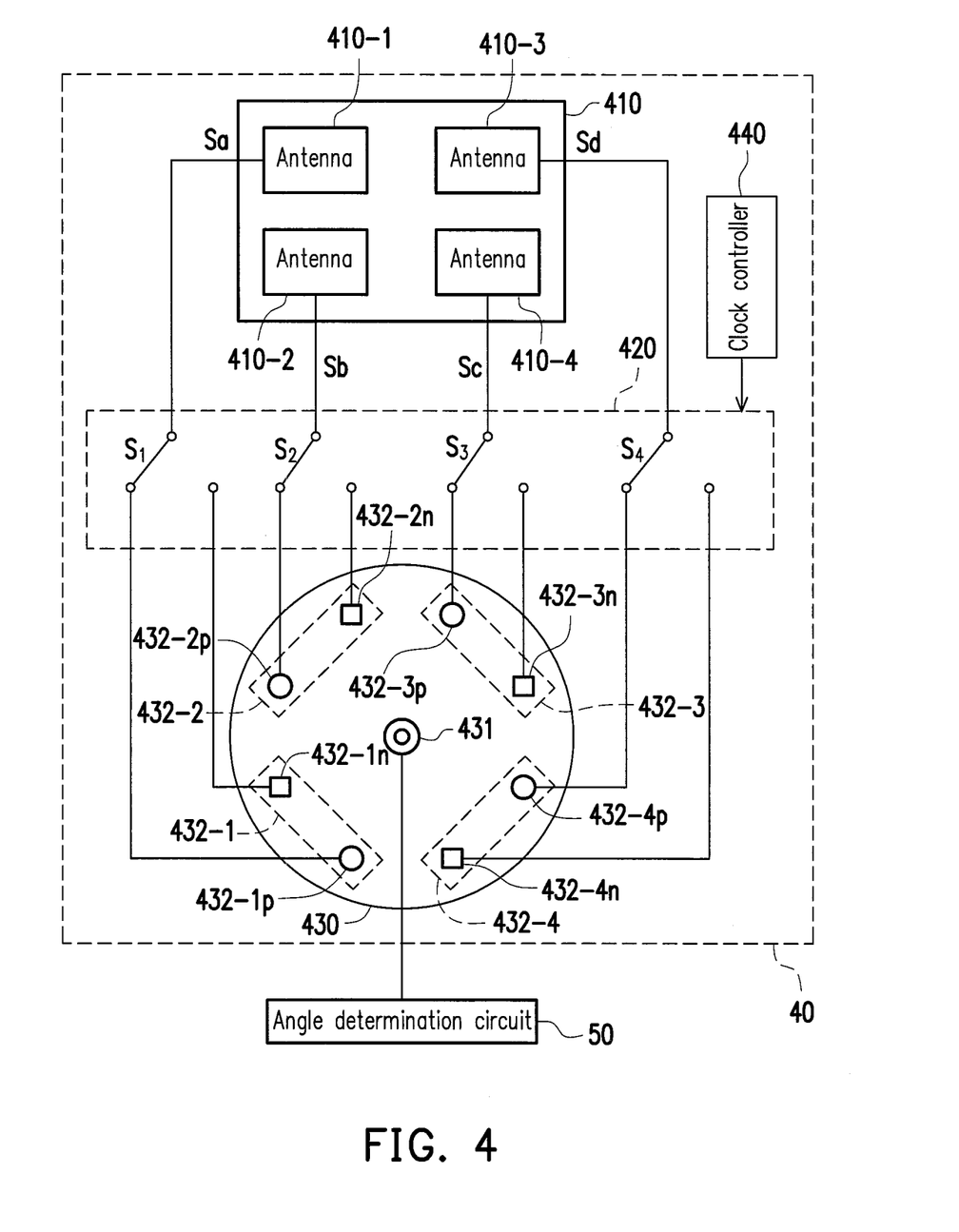
FIG. 4 is a structural schematic diagram of a comparator of a mono-pulse radar according to another embodiment of the invention.

In order to clearly describe the invention, the antenna array with 4 antennas and the TEM mode cavity power combiner with 8 input port sets are taken as an example to describe how to obtain the combination/difference signals required by the post analysis circuit, thought the invention is not limited thereto. FIG. 4 is a structural schematic diagram of a comparator of a mono-pulse radar according to another embodiment of the invention. Referring to FIG. 4, the comparator 40 of the mono-pulse radar is coupled to an angle determination circuit 50, and compares the received reflected signals and transmits a result to the angle determination circuit 50, and the angle determination circuit 50 further calculates the angle of the object according to the combination/difference signal output by the comparator.

The comparator 40 includes an antenna array 410, a switch device 420 and a TEM mode cavity power combiner 430. The coupling relationship and functions of the above devices are the same or similar to that of the embodiment of FIG. 2, which are not repeated. It should be noticed that as that shown in FIG. 4, the antenna array 410 includes antennas 410-1, 410-2, 410-3 and 410-4, and the switch device 420 is composed of four switches S1, S2, S3 and S4. The antenna 410-1 is coupled to the switch S1, the antenna 410-2 is coupled to the switch S2, the antenna 410-3 is coupled to the switch S3, and the antenna 410-4 is coupled to the switch S4.

The TEM mode cavity power combiner 430 includes a combination port 431 and input port sets 432-1, 432-2, 432-3 and 432-4. The input port set 432-1 has a positive input port 432-1p and a negative input port 432-1n. Similarly, the input port set 432-2 has a positive input port 432-2p and a negative input port 432-2n, the input port set 432-3 has a positive input port 432-3p and a negative input port 432-3n, and the input port set 432-4 has a positive input port 432-4p and a negative input port 432-4n. The input port set 432-1 is coupled to the switch S1, the input port set 432-2 is coupled to the switch S2, the input port set 432-3 is coupled to the switch S3, and the input port set 432-4 is coupled to the switch S4. It should be noticed that different to the aforementioned embodiment, the comparator 40 of the present embodiment further has a clock controller 440. The clock controller 440 is coupled to the switch device 420 and outputs a clock control signal to control the switch device 420, so as to switch one of the positive input port or the negative input port of each of the input port sets 432-1, 432-2, 432-3 and 432-4 to connect the corresponding antenna 410-1, 410-2, 410-3 and 410-4. In brief, the clock controller 440 outputs the clock signal to regularly switch the switches S1-S4, and a clock output frequency thereof is determined according to an actual application, which is not limited by the invention.

Namely, in the present exemplary embodiment, the switches S1, S2, S3 and S4 can be switched according to the clock control signal output by the clock controller, so as to determine to input the reflected signal received by each of the antennas 410-1, 410-2, 410-3 and 410-4 to the positive input port or the negative input port of each of the input port sets. For example, by switching the switch S1, the reflected signal received by the antenna 410-1 is determined to be input to the positive input port 432-1p or the negative input port 432-1n. Deduced by analogy, by switching the switch S4, the reflected signal received by the antenna 410-4 is determined to be input to the positive input port 432-1p or the negative input port 432-1n. Moreover, the combination port 431 is coupled to the angle determination circuit 50, and outputs a combination signal combined by the comparator 40 to the angle determination circuit 50, and the angle determination circuit 50 of the mono-pulse radar may accordingly calculate the angle information of the object.

Therefore, when the mono-pulse radar sends the detection signals through the antenna array 410 to contact the object, the reflected signals are reflected to the antenna array 410 and are received by the antennas 410-1, 410-2, 410-3 and 410-4. The antennas in the antenna array 410 respectively transmit the received reflected signals to the switches in the switch device 420. For example, the reflected signal Sa received by the antenna 410-1 is transmitted to the switch S1, and the switch S1 determines to transmit the reflected signal Sa received by the antenna 410-1 to the positive input port 432-1p or the negative input port 432-1n. Similarly, the reflected signal Sb received by the antenna 410-2 is transmitted to the switch S2, and the switch S2 determines to transmit the reflected signal Sb received by the antenna 410-2 to the positive input port 432-2p or the negative input port 432-2n.

Figure 5:
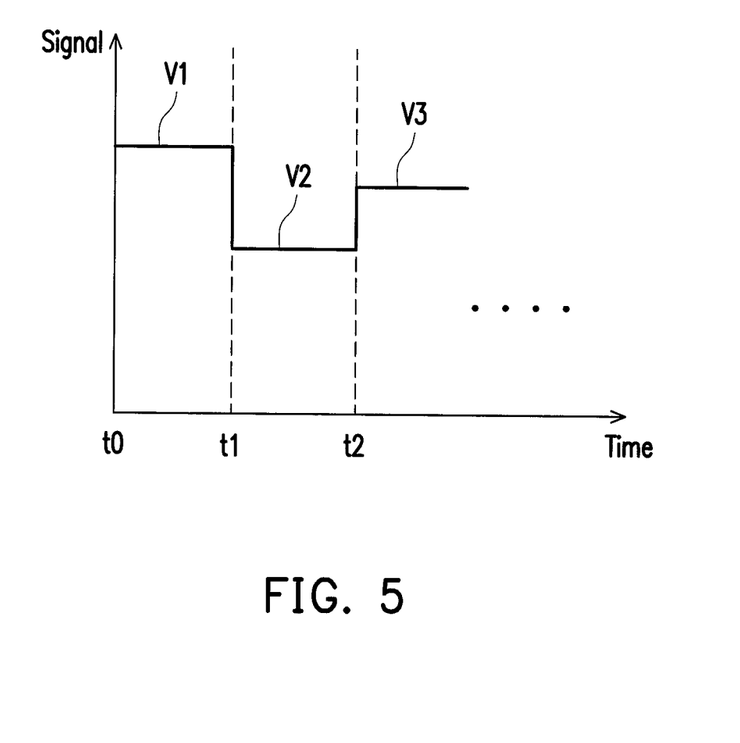
FIG. 5 is a schematic diagram of a relationship between time and output signals of the comparator according to an embodiment of the invention.

According to the above descriptions, it is known that the positive input port and the negative input port respectively produce the phase difference of 0 degree and 180 degrees, and through the regular switching of the switches S1, S2, S3 and S4, the comparator 40 outputs the combination/difference signals required by the angle determination circuit 50. For example, FIG. 5 is a schematic diagram of a relationship between time and output signals of the comparator according to an embodiment of the invention. Referring to FIG. 5, at a time point t0, the switch S1 is connected to the positive input port 432-1p of the input port set 432-1, the switch S2 is connected to the positive input port 432-2p of the input port set 432-2, the switch S3 is connected to the positive input port 432-3p of the input port set 432-3, and the switch S4 is connected to the positive input port 432-4p of the input port set 432-4. Therefore, at the time point t0, the combination port 431 generates an output signal V1, which can be represented by $$\frac{(Sa+Sb)+(Sc+Sd)}{4}.$$

At a time point t1, the switch device 420 receives the clock signal of the clock controller 440, and each of the switches is switched to a next predetermined state.

In detail, in the exemplary embodiment of FIG. 5, at the time point t1, the switch S1 is kept to be connected to the positive input port 432-1p of the input port set 432-1, the switch S2 is switched to the negative input port 432-2n of the input port set 432-2, the switch S3 is kept to be connected to the positive input port 432-3p of the input port set 432-3, and the switch S4 is switched to the negative input port 432-4n of the input port set 432-4. Therefore, at the time point t1, the combination port 431 generates an output signal V2, which can be represented by $$\frac{(Sa+Sc)-(Sb+Sd)}{4}.$$

Deduced by analogy, at a time point t2, the switch device 420 again receives the clock signal of the clock controller 440, and each of the switches is switched to a next predetermined state.

In detail, in the exemplary embodiment of FIG. 5, at the time point t2, the switch S1 is kept to be connected to the positive input port 432-1p of the input port set 432-1, the switch S2 is switched to the positive input port 432-2p of the input port set 432-2, the switch S3 is switched to the negative input port 432-3n of the input port set 432-3, and the switch S4 is kept to be connected to the negative input port 432-4n of the input port set 432-4. Therefore, at the time point t2, the combination port 431 generates an output signal V3, which can be represented by $$\frac{(Sa+Sb)-(Sc+Sd)}{4}.$$

In this way, the comparator 40 sequentially transmits the output signals V1, V2 and V3 to the angle determination circuits 50, and the angle determination circuit 50 obtains the angle information of the target according to the output signals V1, V2 and V3.

Figure 6A:
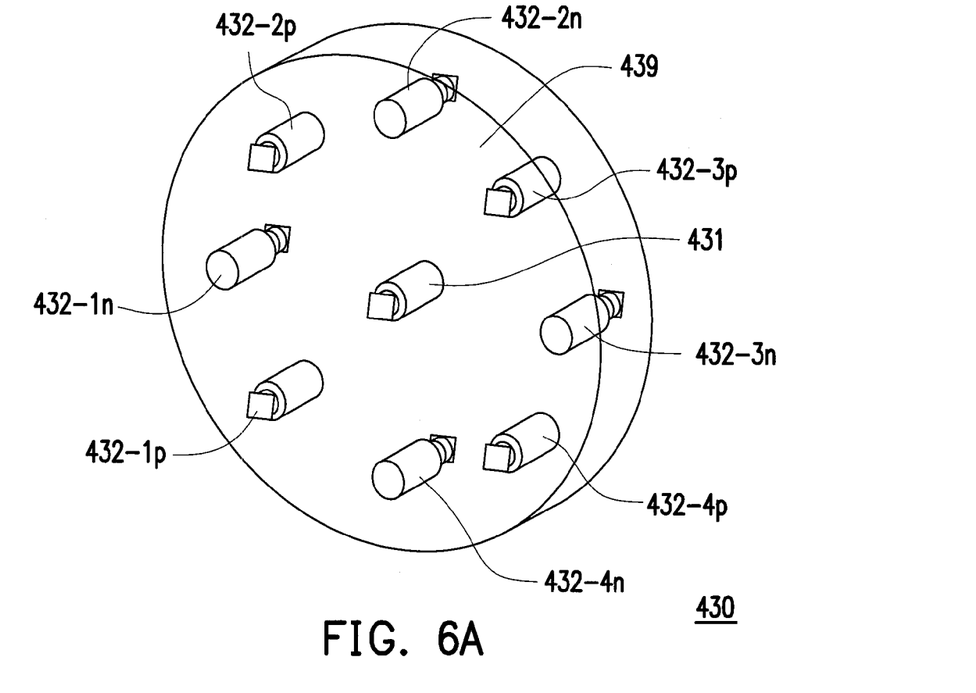
FIG. 6A is a schematic diagram of a TEM mode cavity power combiner according to another embodiment of the invention.
Figure 6B:
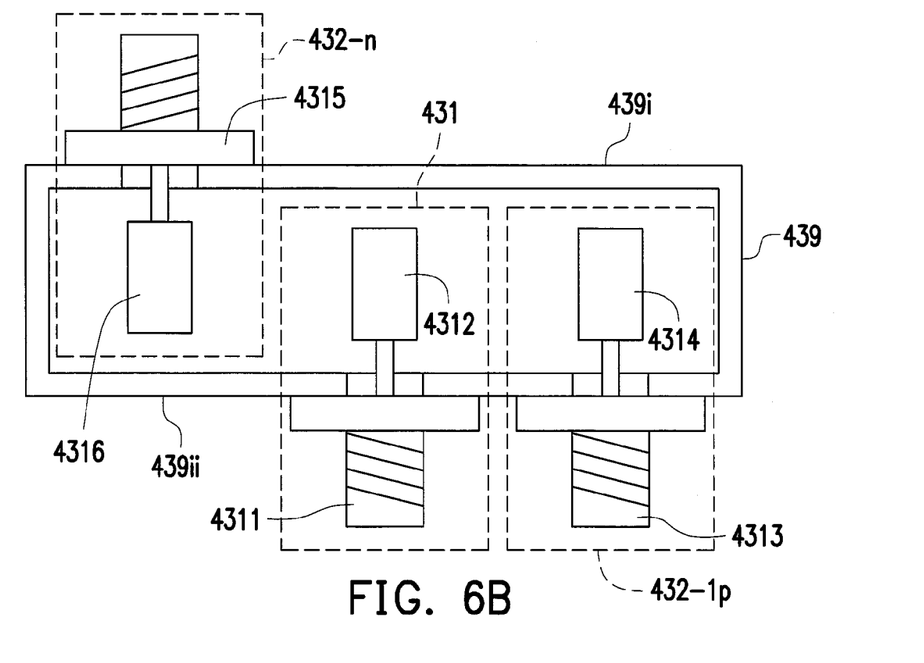
FIG. 6B is a side view of a TEM mode cavity power combiner according to another embodiment of the invention.

In the following content, the TEM mode cavity power combiner is described in detail. FIG. 6A is a schematic diagram of the TEM mode cavity power combiner 430 according to the previous embodiment of the invention. FIG. 6B is a schematic diagram of a combination port and input ports of a TEM mode cavity power combiner according to another embodiment of the invention. Referring to FIG. 6A and FIG. 6B, the TEM mode cavity power combiner 430 includes a cylindrical metal cavity 439, and the metal cavity 439 has two circular surfaces of a first surface 439i and a second surface 439ii. The combination port 431 is disposed at a center of circle of the first surface 439i of the metal cavity 439. Similarly, the positive input ports 432-1p, 432-2p, 432-3p and 432-4p of the input port sets 432-1, 432-2. 432-3 and 432-4 are disposed on the first surface 439i of the metal cavity 439. On the other hand, the negative input ports 432-1n, 432-2n, 432-3n and 432-4n of the input port sets 432-1, 432-2. 432-3 and 432-4 are disposed on the second surface 439ii of the metal cavity 439.

The positive input ports 432-1p, 432-2p, 432-3p and 432-4p and the negative input ports 432-1n, 432-2n, 432-3n and 432-4n are equally spaced and arranged in interleaving on the first surface 439i and the second surface 439ii while taking the combination port 431 as a center of circle. Referring to FIG. 6B, structures of each positive input port, each negative input port and the combination port are substantially the same, and respectively include a coaxial RF connector and a metal cylinder. In the present embodiment, the coaxial RF connector is, for example, a subMiniature version A (SMA) connector, though the invention is not limited thereto, and the coaxial RF connector can also be implemented as other types of coaxial RF connector. As that shown in FIG. 6B, the combination port 431 includes a SMA connector 4311 and a metal cylinder 4312. The positive input port 432-1p includes a SMA connector 4313 and a metal cylinder 4314, and the negative input port 432-1n includes a SMA connector 4315 and a metal cylinder 4316.

In FIG. 6B, the positive input port 432-1p and the negative input port 432-1n are schematically illustrated, and device structures of the other positive input ports and the negative input ports are similar to that of the positive input port 432-1p and the negative input port 432-1n. The SMA connectors 4311, 4313 and 4315 are disposed outside the metal cavity 439 for receiving or outputting signals. The metal cylinders 4312, 4314 and 4316 are respectively coupled to the SMA connectors 4311, 4313 and 4315, and are disposed within the metal cavity 439, where radiuses and lengths of the metal cylinders 4312, 4314 and 4316 control a signal characteristic of an output signal. In brief, the radiuses and the lengths of the metal cylinders influence a presentation result of the output signal of the comparator.

According to the above descriptions, each of the input port sets has the positive input port and the negative input port disposed on different surfaces. In other words, an external signal can be fed in through a front surface (the first surface 439i) of the TEM mode cavity power combiner 430 or through a back surface (the second surface 439ii) of the TEM mode cavity power combiner 430, and the above two signal feeding method may produce the phase difference of 0 degree and 180 degree at the combination port 431 located at the center of circle. According to such characteristic, in collaboration with the switching control of the switch device 420 on the positive input ports and the negative input ports, the reflected signal received by the single antenna may present two phase variations.

It should be noticed that a position of each input port (for example, a distance between the input port and the combination port) and the radius and the length of the metal cylinder thereof may control a matching degree of the comparator. For example, the distance between each of the input ports and the center of circle may influence impedance matching. Since the TEM mode cavity power combiner 430 shown in FIG. 6A and FIG. 6B is not designed based on a resonance principle of metal cavity, the port feed-in point is a single conductive structure, and a transmission wave is a TEM wave, the frequency response is broad. In this way, by configuring the position of the input port or designing the radius and the length of the metal cylinder, the signal required by an actual application is obtained.

In summary, the invention provides a comparator of a mono-pulse radar and a signal generation method thereof, in which the switch device is used to switch a signal feeding position of the TEM mode cavity power combiner, so as to produce the phase difference of 0 degree and 180 degrees at the combination port. In this way, via controlling of the switch device, the comparator of the mono-pulse radar may generate the combination/difference signals required by the backend circuit in time-division, so as to further analyze angle information of the object. Moreover, as the TEM mode cavity power combiner has a broadband characteristic, the operation bandwidth of the comparator of the mono-pulse radar is effectively enhanced. In addition, by adjusting the length and the radius of the metal cylinder of the port or by configuring the position thereof, the comparator of the mono-pulse radar with better matching degree and broader application range can be designed.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A comparator of a mono-pulse radar, comprising:
   an antenna array, comprising N antennas, wherein N is an integer greater than 1;
   a transverse electromagnetic (TEM) mode cavity power combiner, comprising a combination port and M input port sets, wherein each of the input port sets has a positive input port and a negative input port, wherein M is an integer greater than 1; and
   a switch device, coupled between the antenna array and the TEM mode cavity power combiner, and transmitting reflected signals received by each of the antennas to the positive input port or the negative input port of the input port sets,
   wherein the combination port of the TEM mode cavity power combiner generates an output signal according to the reflected signals received from the input port sets.

2. The comparator of the mono-pulse radar as claimed in claim 1, further comprising:
   a clock controller, coupled to the switch device, and outputting a clock control signal to control the switch device, so as to switch one of the positive input port and the negative input port of each of the input port sets to connect the corresponding antenna.

3. The comparator of the mono-pulse radar as claimed in claim 1, wherein the TEM mode cavity power combiner further comprises a cylindrical metal cavity, and the combination port is disposed at a center of a first surface of the metal cavity.

4. The comparator of the mono-pulse radar as claimed in claim 3, wherein the positive input port and the negative input port of each of the input port sets are equally spaced while taking the combination port as a center of circle, and the positive input port of each of the input port sets is disposed on the first surface of the metal cavity, and the negative input port of each of the input port sets is disposed on the second surface of the metal cavity.

5. The comparator of the mono-pulse radar as claimed in claim 3, wherein the positive input port, the negative input port and the combination port respectively comprise:
   a coaxial RF connector, disposed outside the metal cavity, and receiving or outputting signals; and
   a metal cylinder, coupled to the coaxial RF connector, and disposed within the metal cavity, wherein a radius and a length of the metal cylinder control a matching degree of the comparator.

6. A signal generation method, adapted to a comparator of a mono-pulse radar, wherein the comparator comprises an antenna array, a switch device and a TEM mode cavity power combiner, the antenna array comprises N antennas, the TEM mode cavity power combiner has a combination port and M input port sets, and each of the input port sets has a positive input port and a negative input port, wherein N and M are integers greater than 1, the signal generation method comprising:
   receiving reflected signals through the antennas of the antenna array;
   transmitting the reflected signal received by each of the antennas to the positive input port or the negative input port of the input port sets through the switch device; and
   generating an output signal according to the reflected signals received from the input port sets, and outputting the output signal through the combination port.

* * * * *